United States Patent

Cricchio et al.

[11] 3,865,812
[45] Feb. 11, 1975

[54] 3-ACYLHYDRAZONOMETHYL RIFAMYCINS

[75] Inventors: Renato Cricchio, Varese; Giancarlo Lancini, Pavia, both of Italy

[73] Assignee: Gruppo Lepetit S.p.A., Milan, Italy

[22] Filed: Mar. 16, 1973

[21] Appl. No.: 342,047

[30] Foreign Application Priority Data
Mar. 27, 1972 Italy............................ 22421-A/72

[52] U.S. Cl............................ 260/239.3 P, 424/244
[51] Int. Cl............................................. C07d 87/54
[58] Field of Search............................ 260/239.3 P

[56] References Cited
UNITED STATES PATENTS
3,342,810    9/1967    Maggi et al................. 260/239.3 P Primary Examiner—Henry R. Jiles
Assistant Examiner—Robert T. Bond
Attorney, Agent, or Firm—Theodore Post; C. Kenneth Bjork

[57] ABSTRACT

3-Acylhydrazonomethyl rifamycin SV derivatives, of formula (I)

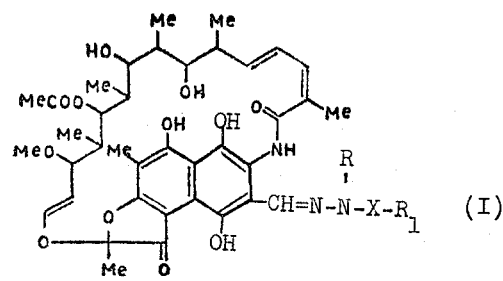

and 25-desacetyl and 16, 17; 18, 19; 28, 29-hexahydro derivatives thereof in which X is a —CO—, —CS—, —C(:NH)— or —SO$_2$— group, Me is a methyl group, R is hydrogen, R$_1$ is a member of the group consisting of (a) alkyl, alkoxy, aryl and aralkyl groups; (b) an —NR$_2$R$_3$ group wherein R$_2$ and R$_3$ are independently selected from the group of hydrogen, C$_1$-C$_6$ lower alkyl, C$_3$-C$_6$ lower alkenyl, nitro and anilino groups; (c) a —CO—NH—N=CH—A or a —(R$_4$)—CO—NH—N=CH—A group, wherein R$_4$ is a divalent aliphatic, cycloaliphatic, aromatic or heterocyclic group and A represents the rifamycin SV group:

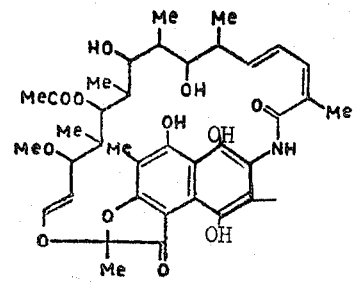

or the corresponding 25-desacetyl or 16, 17; 18, 19; 28, 29-hexahydro derivative thereof; and R and R$_1$ taken together with the adjacent —N—X—group may represent a 5- to 7-membered heterocyclic ring fused with a benzene nucleus.

The compounds are prepared by reacting at a water-liberating temperature 3-formylrifamycin SV or its 25-desacetyl or the corresponding hexahydro derivative in a suitable organic solvent with a substantially equimolar amount of a substituted hydrazine of the formula $$H_2N-N-X-R_5 \quad \text{(II)}$$
$$\phantom{H_2N-N}|\phantom{-X-R_5}$$
$$\phantom{H_2N-N}R$$

wherein R and X have the same meaning as before, and R$_5$ may be the same as R$_1$ under (a), (b) or (c) as given above or it may further represent a —CO—NH—NH$_2$ or a —(R$_4$)—CO—NH—NH$_2$ group wherein R$_4$ has the same meaning as before; or R and R$_5$ taken together may also represent a carbocyclic chain forming with the adjacent —N—X—group a 5- to 7-membered heterocyclic ring fused with a benzene nucleus. The compounds have antimicrobial activity.

1 Claim, No Drawings

3-ACYLHYDRAZONOMETHYL RIFAMYCINS

BRIEF SUMMARY OF THE INVENTION

This invention is concerned with 3-acylhydrazonomethyl rifamycins corresponding to formula (I)

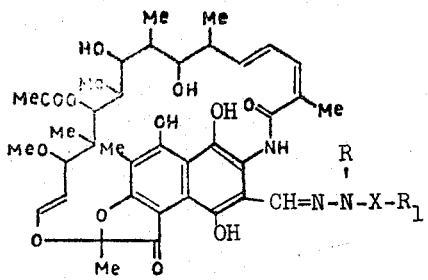

and to 25-desacetyl and 16, 17; 18, 19; 28, 29-hexahydro derivatives thereof in which Me is a methyl group, X is a —CO—, —CS—, —C(:NH)— or —SO$_2$-group, R is hydrogen, R$_1$ is a member selected from the group consisting of: (a) alkyl, alkoxy, aryl and aralkyl, (b) an —NR$_2$R$_3$ group wherein R$_2$ and R$_3$ are independently selected from hydrogen, C$_1$–C$_6$ lower alkyl, C$_3$–C$_6$ lower alkenyl, nitro and anilino, (c) a —CO—N-H—N=CH—A or a —(R$_4$)—CO—NH—N=CH—A group wherein R$_4$ is a divalent aliphatic, cycloaliphatic, aromatic or heterocyclic group and A represents the rifamycin SV group:

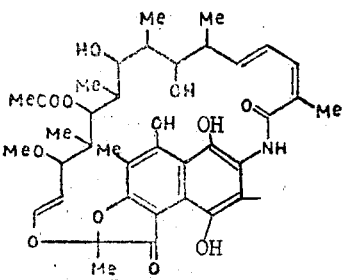

or the corresponding 25-desacetyl or 16, 17; 18, 19; 28, 29-hexahydro derivative thereof; and R and R$_1$ taken together with the adjacent —N—X-group may represent a 5- to 7-membered heterocyclic ring fused with a benzene nucleus.

The compounds of this invention are further characterized in that:

1. when X is a —CO— group, R$_1$ may not be an —NH$_2$ group;
2. when X is —(C:NH)—, R$_1$ may not be an —NH$_2$ group;
3. and when X is —SO$_2$—, R$_1$ may not be p-tolyl.

The term "alkyl" alone or as part of a compound term such as, for instance, "alkoxy," designates a straight or branched chain alkyl group having from 1 to 20 carbon atoms. The alkyl groups may also carry one or more substituents selected from halo, nitro, cyano, hydroxy, alkoxy, oxo, carboxy, carbalkoxy, amino, acylamino, hydroxyamino, sulfo, sulfamido and thiono. The term "aryl" alone and in compound terms designates phenyl and naphthyl groups which may also have one or more ring substituents including, for instance, 1 to 6 carbon lower alkyl, 3to 6 carbon lower alkenyl, cycloalkyl, phenyl, amino, acylamino, hydroxyamino, mono and di-lower alkylamino, cyano, halo, nitro, 1 to 6 carbon lower alkoxy, methylenedioxy, sulfo, carboxy, carbalkoxy, carbamyl, sulfonamido and the like. the term "cycloalkyl" designates 3 to 10 carbon atom cycloalkyl groups and may also identify bridged or spyro systems. The term "aralkyl" designates 1 to 6 carbon alkyl groups substituted with one or more aryl groups. When the groups R and R$_1$ taken together with the adjacent —N-X-group form a benzo fused 5- to 7-membered heterocyclic ring and X is a —CO— group, the heterocyclic portion may carry as a substituent another oxo group.

The process for preparing the new compounds consists in condensing 3-formylrifamycin SV and its 25-desacetyl derivative or the corresponding hexahydro compound in a suitable organic solvent with a substantially equimolecular amount of a substituted hydrazine of the formula

wherein R and X have the same meaning as above, and R$_5$ may have the same meaning as R$_1$ under (a), (b) or (c) above or may further represent a —CO—NH—NH$_2$ or a —(R$_4$)—CO—NH—NH$_2$ group wherein R$_4$ has the same meaning as above; R and R$_5$ taken together may also represent a carbocyclic chain forming with the adjacent —N-X-group a 5- to 7-membered heterocyclic ring fused with a benzene nucleus. The reaction temperature is generally room temperature, but if the reaction rate is low, the mixture may be heated to the boiling temperature of the solvent. The reaction may be followed by evolution of water of condensation. As is evident, if a derivative of formula (II) carrying two hydrazine functions is employed, the final product is an azine of 3-formylrifamycin SV of formula (I), falling within paragraph (c).

The new compounds are colored solids which may be crystallized from common organic solvents such as, for example, lower alkanols, ethyl acetate, dioxane, tetrahydrofuran, benzene and liquid chlorinated hydrocarbons. Their solubility in organic solvents depends obviously on the nature and the size of the various substituents R, R$_1$ and X. When an acidic function is present, the compounds are also soluble in water as a salt with a suitable base such as, for instance, an alkali metal base.

DESCRIPTION OF SOME PREFERRED EMBODIMENTS

The following example describes the preparation of representative specific embodiments and the best mode contemplated by the inventors of carrying out the invention.

EXAMPLE

To a tetrahydrofuran solution of 0.01 mole of 3-formylrifamycin SV or the 25-desacetyl derivative thereof or the corresponding 16, 17; 18, 19; 28, 29-hexahydro derivative, 0.01 mole of a substituted hydrazine of the formula H$_2$N—NR—X—R$_5$, as previously described is added at room temperature. Generally, the reaction is completed in 2 to 3 hours. In the event that a chromatographic assay on a silica-gel plate then indicates that the reaction is not completed, the mixture is refluxed for an additional 15–45 minutes. The reaction mixture is evaporated to dryness and the crude solid is purified by crystallization from an organic solvent, such as, for example, methanol, ethyl acetate, or chloroform or by column chromatography.

In the following Table I are given the chemicophysical data of representative compounds of formula (I) prepared as described above from 3-formylrifamycin SV and a hydrazine derivative of formula (II).

TABLE I

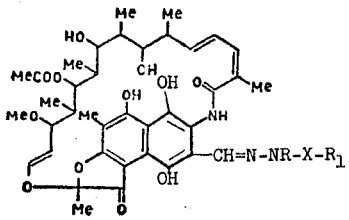

| Starting hydrazine compound | R | $R_1$ | X | Crystallization solvent or chromatography | M.p. or decomposition, °C. | Yield % | Significant U.V. and visible bands |  |
|---|---|---|---|---|---|---|---|---|
|  |  |  |  |  |  |  | $\lambda$ max | $E^{1\%}_{1\ cm.}$ |
| $H_2N-HN-\underset{\underset{S}{\|\|}}{C}-NH_2$ | H | $NH_2$ | CS | THF | 180 | 70 | 484;343 | 187.9;389 |
| $H_2N-NH-CO-CH_3$ | H | $CH_3$ | CO | Methanol | 174-7 | 45 | 478;334 | 191.1;334.3 |
| $H_2N-N\underset{CH_2}{\overset{O=C-CH_2}{\diagdown}}$ (phthalimide-like) |  | $\overset{CH_2}{\diagup}\underset{CH_2}{\diagdown}$ | CO | Acetone | 188-90 | 50 | 480;335 | 159;271 |
| $H_2N-N\underset{CH_2}{\overset{O=C}{\diagdown}}$ (benzyl) |  | $\overset{CH_2}{\diagdown}$ | CO | Ethyl acetate | 253-55 | 80 | 490;345;315 | 151;306;255 |
| $H_2N-NH-OC\underset{}{\overset{CH_2-CH_2OH}{\diagdown}}$ | H | $\overset{CH_2-CH_2OH}{\diagdown}$ CO | | Ethyl acetate | 238 | 60 | 480;337 | 166;305 |
| $H_2N-N\underset{}{\overset{CH_2-CH_2}{\diagdown}}$ | | $\overset{CH_2-CH_2}{\diagdown}$ | CO | Ethyl acetate | 266-70 | 95 | 485;343 | 159;253 |
| $H_2N-N\underset{}{\overset{O}{\diagdown}}$ | | $\overset{O\ \|\|\ C-CH_2}{\diagdown}$ | CO | Methanol | 215-7 | 80 | U.V. Spectrum not carried out as the product decomposes | |
| $H_2N-NH-CO-CH_2CN$ | H | $-CH_2CN$ | CO | Methanol | 188-90 | 65 | 480;333 | 186.6;315.3 |
| $H_5C_2OOC-N-CH_2\underset{OH}{\overset{H_2N-NH-CO}{\diagdown}}$ | H | $HO-N-CH_2\underset{COOC_2H_5}{\diagdown}$ | CO | Benzene | 185-7 | 60 | 484;337 | 150;264 |
| $H_2N-NH-CO-\underset{CH_2OH}{\overset{\|}{C}}=(C_6H_5)_2$ | H | $\underset{HOCH_2}{\overset{\|}{C}}=(C_6H_5)_2$ | CO | Benzene | 178-80 | 90 | 471;328 | 137;237 |
| $H_2N-NH-CO\underset{HOCH_2}{\diagdown}$ | H | $\underset{HOCH_2}{\diagdown}$ | CO | Benzene | 175-8 | 75 | 478;334 | 161;290.4 |
| $H_2N-NH-CO-\underset{CH_2OH}{\overset{C_6H_5}{\underset{\|}{C}}}\underset{CH_3}{\diagdown}$ | H | $-\underset{HOCH_2}{\overset{C_6H_5}{\underset{\|}{C}}}\underset{CH_3}{\diagdown}$ | CO | Benzene | 181-3 | 55 | 476;334 | 156;275 |
| $H_2N-NH-CO-CH_2CH_3$ | H | $-CH_2-CH_3$ | CO | Carbon tetrachloride | 187-9 | 75 | 480;333 | 190;331 |
| $H_2N-NH-CO-CH(CH_3)_2$ | H | $-CH(CH_3)_2$ | CO | Ethyl acetate/ligroin | 185-7 | 55 | 480;333 | 188;324 |
| $H_2N-NH-CO-CH\underset{CH_2}{\overset{CH_2}{\diagdown}}$ | H | $-CH\underset{CH_2}{\overset{CH_2}{\diagdown}}$ | CO | Ethyl acetate/ligroin | 185-7 | 50 | 480;335 | 197;347 |

TABLE 1 CONT.

| Starting hydrazine compound | R | R₁ | X | Crystallization solvent or chromatography | M.p. or decomposition, °C. | Yield % | λ max | E 1% 1 cm |
|---|---|---|---|---|---|---|---|---|
| H₂N-NH-CO-CH₂-CH₂-C₆H₅ | H | -CH₂-CH₂-C₆H₅ | CO | Ethyl acetate/ligroin | 177-9 | 55 | 480;335 | 173;306 |
| H₂N-NH-CO-C₆H₄-CH₂-CH(CH₃)₂ | H | -C₆H₄-CH₂-CH(CH₃)₂ | CO | Ethyl acetate/ligroin | 173-5 | 35 | 480;335 | 155;276 |
| H₂N-NH-CO-(CH₂)₃-C₆H₅ | H | (CH₂)₃-C₆H₅ | CO | Ethyl acetate/ligroin | 158-60 | 60 | 480;337 | 171;275 |
| H₂N-NH-CO-CH₂-(naphthyl) | H | CH₂-(naphthyl) | CO | Carbon tetrachloride | 167 | 60 | 480;335 | 155;278 |
| H₂N-NH-CO-C₆H₄-C₆H₅ | H | -C₆H₄-C₆H₅ | CO | Benzene | 188 | 92 | 490;343 | 139;286 |
| H₂N-NH-CO-CH₂-C₆H₅ | H | -CH₂-C₆H₅ | CO | Ethyl acetate | 168 | 75 | 480;335 | 174;293 |
| H₂N-NH-CO-C₆H₃(OCH₃)₂ | H | -C₆H₃(OCH₃)₂ | CO | Methanol | 192-5 | 90 | 490;341 | 156.7;283.7 |
| H₂N-NH-CO-CH(NH₂)-CH₂-C₆H₄-OH | H | -CH(NH₂)-CH₂-C₆H₄-OH | CO | Methanol | 190 | 45 | 480;335 | 147.6;256.3 |
| H₂N-NH-CS-NH-C₂H₅ | H | -NHC₂H₅ | CS | Carbon tetrachloride | 190-4 | 50 | 482;344 | 199.7;401.3 |
| H₂N-NH-C(NH)-NH-NO₂ | H | -NH-NO₂ | CNH | Methanol | 185 | 85 | 490;347 | 201.1;363.8 |
| H₂N-NH-CO-C₆H₄-NH₂ | H | -C₆H₄-NH₂ | CO | Methanol | 250 | 35 | 482;344 | 178.4;401.2 |
| H₂N-NH-CO-C₆H₃(Br)(NH₂) | H | -C₆H₃(Br)(NH₂) | CO | Methanol | 260 | 90 | 490;341 | 166.8;302.1 |
| H₂N-NH-CO-C₆H₄-Cl | H | -C₆H₄-Cl | CO | Methanol | 190 | 85 | 485;341 | 168.5;289 |
| H₂N-NH-CS-NH-C₆H₃(F)(CH₃) | H | NH-C₆H₃(F)(CH₃) | CS | Methanol | 225 | 95 | 485;347 | 193.9;365 |
| H₂N-NH-CO-CH₂O-CH₂-CH₂OH | H | -CH₂O-CH₂-CH₂OH | CO | Ethyl acetate | 169-72 | 40 | 480;335 | 153;262 |
| H₂N-NH-CO-NH-C₆H₄-Cl | H | NH-C₆H₄-Cl | CO | Methanol | 215 | 95 | 480;337 | 191;325 |
| H₂N-NH-COOCH₂CH₂OH | H | OCH₂CH₂OH | CO | Ethyl acetate/ligroin | 197-200 | 85 | 475;333 | 158;277 |
| H₂N-NH-CO-C₆H₅ | H | -C₆H₅ | CO | Methanol | 205-7 | 55 | 485;340 | 155;295 |
| H₂N-NH-CS-NH-C₆H₄-CH₃ | H | NH-C₆H₄-CH₃ | CS | Methanol | 187-90 | 55 | 485;345 | 170;354 |
| H₂N-NH-CO-C₆H₄-OH | H | -C₆H₄-OH | CO | Methanol | 204-6 | 30 | 484;342 | 180.4;316.1 |
| H₂N-NH-CO-C₆H₄-OCH₃ | H | -C₆H₄-OCH₃ | CO | Acetone | 208-10 | 60 | 485;343 | 161.7;315.4 |
| H₂N-NH-CS-NH-NH-C₆H₅ | H | HN-NH-C₆H₅ | CS | Carbon tetrachloride | 210 | 75 | 482;344 | 178.4;344.1 |
| H₂N-NH-CO-(CH₂)₈CH₃ | H | -C₉H₁₉ | CO | Ethyl acetate/ligroin | 148-51 | 78 | 480;335 | 161.5;270.7 |

TABLE I cont.

| Starting hydrazine compound | R | R$_1$ | X | Crystallization solvent or chromatography | M.p. or decomposition, °C. | Yield % | Significant U.V. and visible bands $\lambda_{max}$ | $E^{1\%}_{1\,cm}$ |
|---|---|---|---|---|---|---|---|---|
| H$_2$N-NH-CO-(CH$_2$)$_{10}$CH$_3$ | H | -C$_{11}$H$_{23}$ | CO | Ethyl acetate | 130-33 | 85 | 488;339 | 126.3;242.6 |
| H$_2$N-NH-CO-CH$_2$-CONH-NH$_2$ | H | CH$_2$-CONHN=CHA | CO | Methanol | 223-5 | 65 | 480;336 | 155.9;289.7 |
| H$_2$N-NH-COCONHNH$_2$ | H | -CONHN=CHA | CO | Methanol | 230 | 30 | 505;345 | 142.9;273.1 |
| H$_2$N-NH-CO-C$_6$H$_4$-NH-NH$_2$ | H | -C$_6$H$_4$-CONHN=CHA | CO | Ethyl acetate/ligroin | 230 | 68 | 494;343 | 134.9;264.8 |
| H$_2$N-HN-SO$_2$-C$_6$H$_3$Cl$_2$ | H | -C$_6$H$_3$Cl$_2$ | SO$_2$ | Carbon tetrachloride | 180-4 | 28 | 480;340 | 131.6;221.7 |
| H$_2$N-NH-CO-(CH$_2$)$_2$-CH(NHCOOCH$_2$C$_6$H$_5$)-COOH | H | -(CH$_2$)$_2$-CH(NHCOOCH$_2$C$_6$H$_5$)-COOH | CO | Benzene | 178-80 | 90 | 480;335 | 152.9;265.6 |
| H$_2$N-NH-CO-C$_6$H$_3$Cl$_2$-NH$_2$ | H | -C$_6$H$_3$Cl$_2$-NH$_2$ | CO | Methanol | 170 dec. | 98 | 488;340 | 155.2;274.5 |
| H$_2$N-NH-COCH$_2$-CH$_2$-CONH-NH$_2$ | H | -(CH$_2$)$_2$-COHN-N=CHA | CO | Methanol/ligroin | 220 dec. | 30 | 496;340 | 116;218 |
| H$_2$N-NH-CO-C=(C$_6$H$_5$)$_2$ | H | -C=(C$_6$H$_5$)$_2$ | CO | Ethyl acetate | 180-4 | 95 | 480;336 | 151.5;271.5 |
| H$_2$N-NH-CS-NH-CH$_2$-CH=CH$_2$ | H | NH-CH$_2$-CH=CH$_2$ | CS | Methanol | 265 | 87 | 485;345 | 214;424.7 |
| H$_2$N-NH-CS-NH-C$_6$H$_5$ | H | NH-C$_6$H$_5$ | CS | Methanol | 230 dec. | 96 | 485;348 | 178.1;314.3 |

The microanalytical data of all compounds listed above are in agreement with the calculated values.

Pursuant to the described method, hydrazones of 3-formylrifamycin SV, 25-desacetylrifamycin SV and their hexahydro derivatives are prepared by condensing them with the following hydrazine derivatives:

TABLE II
$H_2N-NR-X-R_5$

| R | R$_5$ | X |
|---|---|---|
| H | -C$_6$H$_4$-NO$_2$ (4-) | CO |
| H | -C$_6$H$_3$(Br)(OH) | CO |
| H | -C$_6$H$_3$(NO$_2$)(NH$_2$)(OH) | CO |
| H | -C$_6$H$_3$(NHCOCH$_3$)(OH) | CO |
| H | -C$_6$H$_3$(OH)(OCH$_3$) | CO |
| H | -C$_6$H$_3$(NO$_2$)$_2$ | CO |
| H | -C$_6$H$_3$(NO$_2$)$_2$ | CO |
| H | -C$_6$H$_2$(OC$_2$H$_5$)$_3$ | CO |
| H | -C$_6$H$_2$(OCH$_3$)$_3$ | CO |
| H | -C$_6$H$_2$(NO$_2$)$_2$(CH$_3$) | CO |
| H | -C$_6$H$_2$(OH)$_2$(CH$_3$) | CO |

TABLE II cont.

| R | R_5 | X |
|---|---|---|
| H | 4-(SO_3H)-C_6H_4- | CO |
| H | 2,3-(OH)_2-C_6H_3-C_6H_5 (2-hydroxybiphenyl) | CO |
| H | 2-(COOH)-C_6H_4- | CO |
| H | 4-(CF_3)-C_6H_4- | CO |
| H | 2,4-(Cl)_2-C_6H_3- | CS |
| H | 4-(NO_2)-C_6H_4- | CS |
| H | C_6H_5- | C(NH) |
| H | 3-hydroxy-2-naphthyl | CO |
| H | C_3H_7 | CO |
| H | n-C_4H_9 | CO |
| H | -(CH_2)_14-CH_3 | CO |
| H | -(CH_2)_16-CH_3 | CO |
| H | -(CH_2)_18-CH_3 | CO |
| H | -CH_2-C_6H_4-C_6H_5 (biphenylmethyl) | CO |
| H | -CH_2-C_6H_5 | CNH |
| H | CH_2(OC_2H_4)_2OH | CO |
| H | -CH_2-(3,4-methylenedioxyphenyl) | CO |
| C_2H_5 | cyclohexyl | CO |
| H | decahydronaphthyl | CO |
| H | cyclooctyl | CO |
| H | adamantyl | CO |
| H | -CH_2-cyclohexyl | CO |

TABLE II cont.

| R | R_5 | X |
|---|---|---|
| H | -(CH_2)_4-CH_3 | SO_2 |
| H | -(CH_2)_10-COOH | SO_2 |
| H | C_6H_5- | SO_2 |
| C_2H_5 | 4-(C_4H_7)-C_6H_4- | SO_2 |
| H | 4-Br-C_6H_4- | SO_2 |
| H | 4-(SO_2NH)-C_6H_4- | SO_2 |
| H | 3-(NO_2)-C_6H_4- | SO_2 |
| H | 2-OCH_3-5-Br-C_6H_3- | SO_2 |
| H | 4-(NH_2)-C_6H_4- | SO_2 |
| H | 1-naphthyl | SO_2 |
| H | OC(CH_3)_3 | CO |
| H | NH-C_6H_4-NO_2 | CO |
| H | -O-(CH_2)_5-CH_3 | CO |
| H | -NH-(CH_2)_4-CH_3 | CNH |
| H | -NH-C_6H_4-Cl | CS |
| H | -NH-3,5-(Cl)_2-C_6H_3- | CO |
| H | -NH-2-CH_3-4-Cl-C_6H_3- | CS |
| H | -NH-C_6H_5 | CS |
| H | -NH-2-Cl-C_6H_4- | CO |
| H | -NH-2,4-(Cl)_2-C_6H_3- | CO |
| H | -NH-3-CH_3-C_6H_4- | CO |

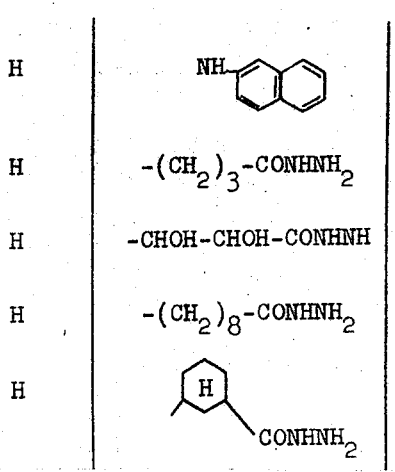

| | | |
|---|---|---|
| H | NH-naphthyl | CO |
| H | $-(CH_2)_3-CONHNH_2$ | CO |
| H | $-CHOH-CHOH-CONHNH$ | CO |
| H | $-(CH_2)_8-CONHNH_2$ | CO |
| H | cyclohexyl-CONHNH$_2$ | CO |

The compounds of the invention have a remarkable antibacterial activity against Gram-positive and Gram-negative bacteria. In particular, the new compounds display a remarkable activity against S. aureus strains. In this case the mineral inhibitory concentration varies from about 0.001 to about 0.05 µg/ml. The compounds are active also against microorganisms resistant to other known and widely used antibiotic substances.

In representative experiments on mice, amounts ranging from about 1 mg/kg. to about 5 mg/kg. p.o. proved highly effective in inhibiting the experimental infection from S. aureus. In other experiments, representative compounds of the invention proved to be active at doses of about 1–5 µg/ml. also against S. aureus Tour strains resistant to other rifamycins usually employed in therapeutic practice. The toxicities of the new compounds are very low and vary from about 250 to about 1,500 mg/kg. i.v. in mice.

Another very important feature of the invention compounds is their inhibiting activity of DNA polymerases which are characteristics of human leukemic blood lymphoblasts and against typical nucleotidyl transferases (polymerases) of viruses not utilized by the normal cell. It is known from studies on representative members of virus groups that they either carry or induce in the host cells polymerases as an essential part of their replication. Thus, there are viruses such as picornaviruses or polioviruses which induce RNA-dependent RNA-polymerase while other groups such as leukemia-sarcoma viruses carry an RNA-dependent DNA-polymerase. The presence and the very important role of the RNA-dependent DNA-polymerase (reverse transcriptase) in oncogenic RNA viruses has been discovered by D. Baltimore, Nature, 226, 1209, (1970) and by H. M. Temin et al., Nature, 226, 1211 (1970). Recent discovery of RNA-dependent DNA-polymerase enzyme in RNA tumor viruses of animal species has been confirmed by other researchers, as the following papers show:

Green et al: Mechanism of carcinogenesis by RNA tumor viruses, I. An RNA-dependent DNA-polymerase in murine sarcoma viruses. Proc. Nat. Acad. Sci. USA 67, 385–393, 1970.

Spiegelman et al: Characterization of the products of RNA direct DNA-polymerases in oncogenic RNA viruses, Nature, London, 227, 563, 1970.

Hatanaka et al.: DNA-polymerase activity associated with RNA tumor viruses. Proc. Nat. Acad. Sci. USA, 67, 143, 1970.

Scolnick et al.: DNA synthesis by RNA containing tumor viruses. Proc. Nat. Acad. Sci. USA, 67, 1034, 1970.

RNA virus implication in some tumors has been supported also by other facts: reverse transcriptase has been found to be present in particles from human milk obtained from women with a familiar history of breast cancer and from inbred population. (Scholn et al.: Nature, 231, 97, 1971). Priori et al. (Nature New Biology, 232, 16, 1971) isolated a virus named ESP-1 containing reverse transcriptase from cells from the pleural fluid of a child with lymphoma and have successfully grown it in tissue cultures. The presence in human breast cancer of RNA homologous to mouse mammary tumor virus RNA has been demonstrated through molecular hybridization experiments by R. Axel et al. (Nature, 235, 32, 1972). The possibility of a human breast cancer virus was also supported by electron microscopy of human milk (N. H. Sarkar et al., Nature, 236, 103, 1972). RNA-directed DNA-polymerase activity and virus like particles have been isolated also from human rhabdomyosarcoma cells (McAllister et al., Nature, New Biol., 235, 3, 1972).

At the present there are no very effective drugs for treating viral diseases, since viruses and cells have common metabolic requirements and pathways. The most promising approach to viral chemotherapy clearly is the design of suitable chemicals which combine specifically with viral or virus-transformed cell polymerases controlling the expression of genetic information of viruses.

Specific inhibitors of the viral or virus-transformed cell enzymes and, in particular, inhibitors of polymerases of RNA tumor viruses may have an important role in providing drugs for leukemia and other cancer therapy.

The inhibiting activity of the inventive compounds has been tested on RNA-dependent DNA-polymerase of endogenous murine sarcoma virus and DNA-dependent DNA-polymerase activity of purified enzymes (poly d A-Tas template). The inhibition was tested according to the methods described by C. Gurgo et al., Nature, New Biology, 229, 111, 1971. The effect of different concentrations of drugs on polymerase activity was determined by following $H^3TTP$ (tritiated thymine deoxyriboside triphosphate) incorporation into the insoluble fraction. A typical example of the experimental procedures is the following:

1. Isolation of virus and purification of viral polymerase

Virus was isolated and purified from murine sarcoma virus (Moloney isolate) transformed rat cells (78A1 cells) and murine sarcoma virus (Harvey isolate) transformed mouse cells (MEH cells) as previously described (M. Green et al., Proc. Nat. Acad. Sci. USA, 67, 385–393, 1970; Rokutanda et al., Nature, 227, 1,026–1,028, 1970). The virion polymerase was purified 20–40 fold by incubation of purified virus with 0.5% NP-40 (nonidet P-40) in 0.1 M NaCl, 0.01 M Tris buffer (pH 7.6), 0.001 M EDTA for 5 minutes at room temperature and zonal centrifugation in 15–30% sucrose gradients in 10 mM sodium phosphate buffer (pH 7.4), 2.5 mM $MgCl_2$, 10 mM dithiothreitol, and 5% glycerol for 24 hours at 38,000 rpm in a Spinco SW 41 rotor. The peak fractions of enzyme activity (13–17) of 22 fractions collected, were pooled, and stored at −70°C. in 30% glycerol.

DNA polymerase assay

Enzyme incubation was performed for 1 hour at

37°C. in 100 μl of reaction mixture containing 40 mM Tris buffer (pH 8.0), 5 mM dithiothreitol, 30 mM NaCl, 2.5 mM MgCl$_2$, 0.1 mM dATP, dGTP, dCTP, and 10 μCi of $^3$H-dTTP (12–18 Ci/mmole) as described by Green et al., in Proc. Nat. Acad. Sci. US 67, 385–393, 1970. The reaction was terminated by the addition of 150 μl of 1N perchloric acid. Calf thymus DNA (100 μg) was added as carrier; the radioactive DNA product was processed as described in the two papers mentioned above. Endogenous RNA-dependent DNA-polymerase activity was measured after the addition of 0.01% NP–40 to purified virus at the time of assay. The DNA-polymerase activity of purified viral polymerase was measured with 2μg of poly d(A-T) as template and no NP–40.

Test for inhibition by 3-acylhydrazonomethyl rifamycin SV derivatives

3-Acylhydrazonomethyl rifamycin SV derivatives were dissolved in dimethyl sulfoxide (DMSO) at a concentration of 5 mg/ml and stored at 4°C. Inhibition of the endogenous RNA-dependent DNA-polymerase activity was tested by adding 2 μl of derivative appropriately diluted in DMSO or 2 μl of DMSO (control) to the assay mixture prior to addition to disrupted virus which contained 15 to 30 μg of viral protein.

Enzyme incubation was performed for 60 minutes at 37°C. Inhibition of purified enzyme was tested by preincubation of 2 μl of derivative or DMSO with 30 μl of enzyme (1 to 2 μg of protein) for 10 minutes at 37°C.; then 70 μl of substrate mixture were added and the mixture further incubated and processed as described above.

In representative tests, the inventive compounds at a concentration of 2–100 μg/ml or less reduced the incorporation of H$^3$-dTTP to less than 10 percent of that found in the control tests, clearly demonstrating inhibition of the mechanism of carcinogenesis by RNA tumor viruses, according to the most recent biochemical points of view.

The inhibiting effect of reverse transcriptases has been confirmed also be tests on polymerase from murine leukemia virus. Murine leukemia virus RNA-dependent DNA-polymerase was prepared from Triton X 100 disrupted virions as described by Gallo et al. in Nature, New Biology, 232, 141, (1971). Viruses of both Rauscher and Moloney types were previously purified by banding in the 1.16 g/ml region of a sucrose density gradient after initial low speed centrifugation to remove cellular debris and cushioning on 60% sucrose through 20% sucrose. Final concentration of virus preparation was at 10$^{11}$ particles/ml. At template, endogenous 70S RNA was used. Concentrations of 50 μg/ml or less were found to be effective in inhibiting the enzyme. Similar results were found by using tumor cell polymerases of human origin. In this case, the inhibiting activity was studied also on normal cell polymerases to characterize a selective effect. Representative rifamycin derivatives of formula (1) have been evaluated for their effects on two purified DNA-polymerases isolated from (1) human normal (PHA-stimulated) blood lymphocytes, (2) a lymphoblast cell line (derived from a normal donor) and (3) human leukemic blood lymphoblast. Synthetic and/or native templates were used.

A typical example of the experimental procedure is the following:

Human Blood Lymphoblasts

Leukemic lymphoblasts were isolated from the peripheral blood of patients with acute lymphocytic leukemia (AII) by leukophoresis. The cells were washed and erythrocytes removed by hypotonic lysis.

Normal lymphocytes were obtained from the peripheral blood from healthy donors after removal of granulocytes by nylon column chromatography. They were stimulated with phytohemagglutinin (PHA) for 72 hours as described before (Gallo et al., Nature, 228, 927, 1970; Gallo et al., Science, 165, 400, 1968) in order to maximize DNA-polymerase activity. However, because of the logistics problem in obtaining sufficient amounts of these cells, a human "normal" tissue culture cell line (1788) was used to supply less purified DNA-polymerases for some of the initial survey studies. Compounds of interest were then studied in more detail with the more purified enzymes from the normal and leukemic blood lymphocytes. These tissue culture cells were obtained from Associated Biomedic Systems, Inc.

DNA Polymerase Preparations

Cellular DNA polymerases were extracted and purified from normal blood (PHA stimulated) lymphocytes, and leukemic blood lymphocytes and (1788) lymphoid cells by homogenization in hypotonic buffer followed by Triton X 100 and/or high salt extraction of the extralysosomal pellet. After differential centrifugation, cellular extracts were further purified by DEAE cellulose, phosphocellulose, and Sephadex G200 column chromatography.

DNA Polymerase Assays

DNA polymerase assays were carried out in a final volume of 100 μl. The assay mixture contained Tris-HCl buffer, pH 8.3, 50 mM; MgAc 6.0 mM; dithiothreitol, 8.0 mM; NaCl, 60 mM.

Adjustment of pH was carried out after addition of inhibitors which were previously dissolved in DMSO. The final concentration of DMSO was 0.5% and all control samples included this amount of DMSO. An enzyme concentration that catalyzes an incorporation of approximately 1.0 pmole/hr was used in the assay. The enzyme was in most cases pre-incubated for 5 minutes with the inhibitor. The reaction was then initiated by the addition of template, either synthetic DNA (poly d(AT) Miles Lab.) and DNA.RNA hybrid (oligo dT.poly rA), at 5 μg/ml or native templates: activated salmon sperm DNA at 50 μg/ml, and endogenous 70S viral RNA; 10 μCi of ($^3$H-methyl)-TTP (New England Nuclear, 18.6 mCi/μmole, lyophilized and redissolved in 0.01 M HCl just prior to usage) and dATP (8 × 10$^{-5}$ M, with synthetic template) or all three deoxynucleoside triphosphates (8 × 10$^{-5}$M with RNA or DNA templated reactions). In some experiments, there was no pre-incubation of enzyme with inhibitor. In these cases reactions were initiated by adding enzyme to the complete reaction mixture which included the inhibitor. Samples were withdrawn at the start of incubation and after 30 minutes and terminated by the addition of 2 ml. of 0.08 M sodium pyrophosphate, and precipitated in 12.5% cold trichloroacetic acid (TCA) with yeast RNA (400 μg) as carrier. The products were collected on a Millipore filter, washed extensively with 5% TCA and 1 ml. of DMSO-ethanol-0.1 M NaCl mixture (0.5:70:29.5), dried and counted in 2 ml. of BBS$_3$ (Beckman) and 10 ml. of liquifluor (New England Nuclear) in a Packard liquid scintillation counter. Concentrations of the compounds of this invention varying from 5 to 20 μg/ml were found to provoke a 50% inhibition of leukemic polymerase with a synthetic DNA template. Reaction templated by a synthetic RNA template (poly rA.rU) were even more susceptible.

Representative compounds of this invention in experiments carried out with native template on normal and tumor cells polymerase showed a higher susceptibility of the tumor enzymes to the tested compounds.

Other biological characteristics displayed by the new rifamycin derivatives include inhibition of focus formation on mouse, rat and human cells by the Moloney and Kirsten strain of murine sarcoma virus; selective inhibition of virus production by already transformed mouse and human cells; detection of revertant cells using the murine sarcoma virus-transformed non-producer mouse and rat cell systems. The rifamycin compounds of the present invention have confirmed their selective toxicity for virus-transformed cells of mouse, rat and human origin when tested for colony-forming ability.

In studies to determine the effect of the compounds in inhibiting focus formation by Moloney sarcoma virus on BALB/3T3 tissue cultures, the following procedure is employed.

BALB/3T3 cell culture are grown in 250 ml. plastic flasks in growth medium consisting of Eagle's minimal essential medium with 10% fetal bovine serum. Cell counts are made with a Coulter counter after suspending the cells with trypsin-EDTA and diluting in growth medium. Moloney murine sarcoma virus, as a tumor homogenate is employed. It is passaged four times in a Swiss-derived high passage mouse embryo cell line and assayed for focus-forming units in BALB/3T3 cells. In conducting the studies, a modification of the method described by Hartley and Rowe, Proc. Nat. Acad. Sci., 55, 780 (1966) is used. In the present work, flasks are seeded with from 1-2 × 10$^6$ cells in 25 ml. of growth medium and incubated at 37°C. for 24 hours. Following the removal of fluids, virus at a predetermined number of focus forming units is introduced into 0.5 ml. of growth medium and allowed to adsorb on the monolayer of cells for 90 minutes at 37°C. Following this adsorption period, a predetermined quantity, usually at a dose rate of from about 5 to 10 µg/ml of a rifamycin compound (previously dissolved in dimethyl sulfoxide at a concentration of 1 mg/ml) and carried in 25 ml. of growth medium, is added and the cultures returned to the incubator. As a control, dimethyl sulfoxide alone in the growth medium is added to a separate culture. After three days' incubation, the cultures are fluid-changed and foci of transformed cells counted at day seven.

In this same method, vesicular stomatitis virus, New Jersey serotype is studied. Methods used to grow and assay this virus have been described by Hackett et al., Virology, 31, 114 (1967). These properties indicate that these substances possess an effective inhibitory activity on virus-induced tumors in animals.

What is claimed is:
1. A rifamycin designated by the formula

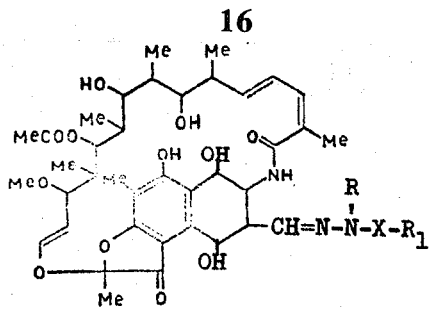

and 25-desacetyl and 16, 17; 18, 19; 28, 29-hexahydro derivatives thereof, wherein Me represents methyl group; X represents a —CO—, —CS—, —C(:NH)— or an —SO$_2$— group; R represents hydrogen; R$_1$ represents 1 to 20 carbon atom alkyl, cyclopropyl, 1 to 20 carbon atom alkoxy, phenyl, naphthyl, substituted phenyl or substituted naphthyl wherein substituents are selected from 1 to 6 carbon lower alkyl, 3 to 6 carbon lower alkenyl, 3 to 10 carbon cycloalkyl, phenyl, amino, 1 to 6 carbon lower alkanoylamino, hydroxyamino, mono- and di- lower alkylamino, cyano, halo, nitro, 1 to 6 carbon lower alkoxy, methylenedioxy, sulfo, carboxy, carbamyl and sulfonamido; a 2 to 6 carbon alkyl group substituted with phenyl, substituted phenyl, naphthyl, or substituted naphthyl, as defined above; —NR$_2$R$_3$ wherein R$_2$ and R$_3$ independently designate hydrogen, C$_1$-C$_6$ lower alkyl, C$_3$-C$_6$ lower alkenyl, nitro, anilino, phenyl, o-tolyl, m-chlorophenyl or 3-fluoro-4-methylphenyl; —CO—NH—N=CH—A or —(R$_4$)—CO—NH—N=CH—A wherein R$_4$ is methylene, ethylene, cyclohexylene, or phenylene and A represents the rifamycin SV group:

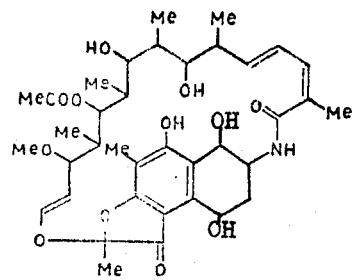

or the corresponding 25-desacetyl and 16, 17; 18, 19; 28, 29-hexahydro derivative thereof; and where R and R$_1$ taken together with the adjacent —N—X-group designate 1,2,3,4-tetrahydro-3-oxo-2-isoquinolinyl or its 1-oxo isomer, 1-oxo-2-isoindolyl or 1,3-dioxo-2-isoindolinyl.

* * * * *

UNITED STATES PATENT OFFICE
CERTIFICATE OF CORRECTION

PATENT NO. : 3,865,812
DATED : February 11, 1975
INVENTOR(S) : Renato Cricchio and Giancarlo Lancini It is certified that error appears in the above—identified patent and that said Letters Patent are hereby corrected as shown below:

Column 1, between lines 7 and 20, the formula should be identified as (I).

Column 7, lines 35 and 36, should be deleted. (They are a repetition of the footnote in Table I.)

Column 8, line 35, "TABLE II" should read -- TABLE II Cont. --.

Column 9, the fourth "H" should be deleted from under column R; and,
Column 9, under column R, across from $-(CH_2)_{18}-CH_3$ (the 13th item under column $R_5$), there should be shown an H.

Column 11, line 26, "mineral" should read -- minimal --.

Column 13, line 52, "At template" should read -- As template --.

Signed and Sealed this twenty-second Day of July 1975

[SEAL]

Attest:

RUTH C. MASON
Attesting Officer

C. MARSHALL DANN
Commissioner of Patents and Trademarks